United States Patent [19]

Bennett et al.

[11] 4,287,913
[45] Sep. 8, 1981

[54] TANK SUITABLE FOR HOLDING LIQUIDS

[75] Inventors: George H. Bennett, Hendon; Alfred W. Osborn; Clive N. Bunyan, both of Harrow; Ronald A. Midgley, St. Albans, all of England

[73] Assignee: Rolls-Royce Limited, London, England

[21] Appl. No.: 177,513

[22] Filed: Aug. 12, 1980

[30] Foreign Application Priority Data

Sep. 29, 1979 [GB] United Kingdom ............... 33866/79

[51] Int. Cl.³ ............................................. F16K 24/04
[52] U.S. Cl. ..................................... 137/574; 137/43; 137/576; 137/587; 137/590; 220/20.5
[58] Field of Search ................... 137/43, 44, 574, 576, 137/587, 590; 220/20.5

[56] References Cited

U.S. PATENT DOCUMENTS

| 2,338,450 | 1/1944 | Martin | 137/576 |
| 2,982,374 | 5/1961 | Hughes | 137/43 X |
| 3,882,815 | 5/1975 | Bennett | 137/43 X |
| 4,210,176 | 1/1980 | Emming | 137/587 X |

Primary Examiner—Robert G. Nilson
Attorney, Agent, or Firm—Cushman, Darby & Cushman

[57] ABSTRACT

An oil tank suitable for an aircraft mounted gas turbine engine is divided into three series connected chambers. Aerated oil after engine use is fed into the first chamber and de-aerated oil withdrawn from the third chamber for engine use. The chambers are interconnected in such a manner that when the tank is inverted, a reservoir of oil is retained within the third chamber to provide a continued supply of oil to the oil outlet for a finite time period and insufficient oil flows into the first chamber from the second to obstruct an air vent provided in the first chamber.

8 Claims, 3 Drawing Figures

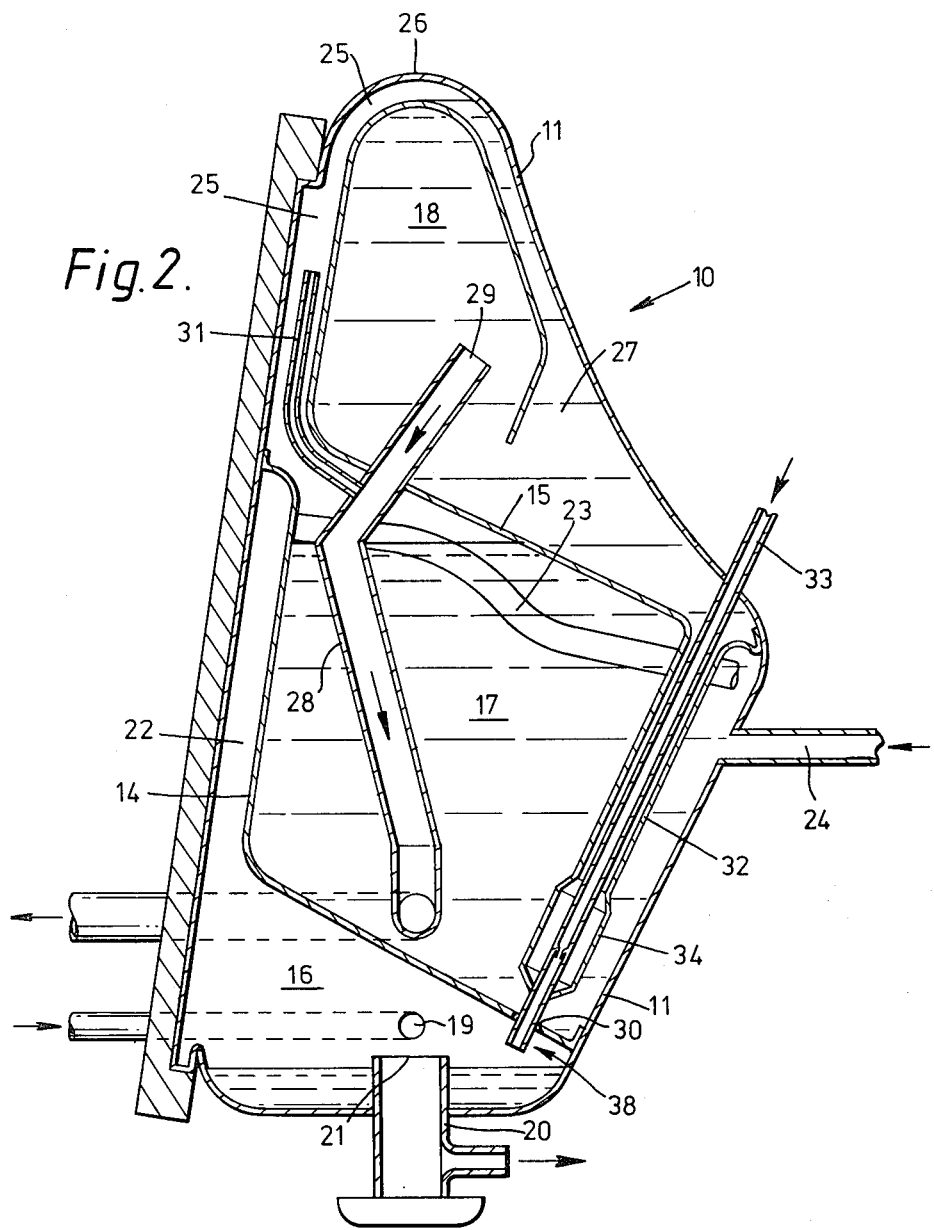

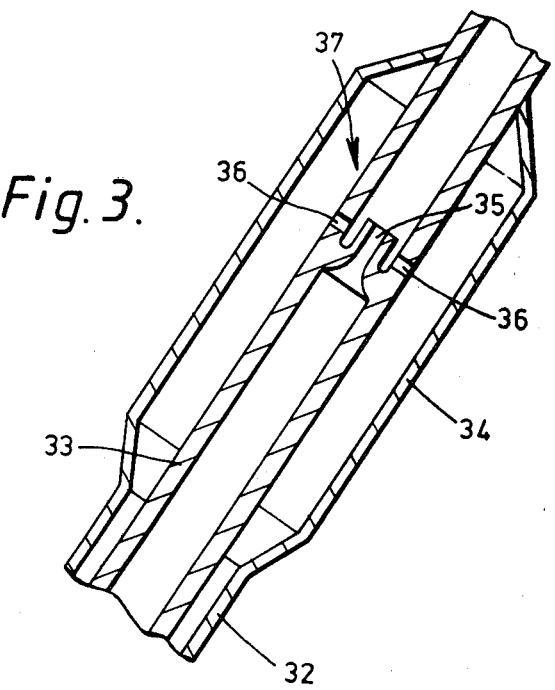

TANK SUITABLE FOR HOLDING LIQUIDS

This invention relates to tank suitable for holding liquids.

Tanks suitable for holding liquids are conventionally very simple structures which retain a reservoir of liquid prior to that liquid being drawn off from the tank for use elsewhere. If the liquid retained within the tank is for use in apparatus subject to movement then it is frequently necessary for the tank to be mounted on the apparatus and consequently subject to that movement. In these circumstances, it sometimes happens that the liquid contained within the tank moves to such an extent that any liquid flow from the tank is interrupted. Such an interruption in liquid flow can be crucial if its continuity is necessary for the continuing functioning of the apparatus concerned.

Gas turbine engines adapted for propelling aircraft are provided with tanks for storing oil prior to that oil being conveyed to various bearings within the engine. If the oil flow from the tank is interrupted, even for a short period, there is a possibility that some bearings, especially plain bearings, could fail through lack of lubrication. Since aircraft are required to alter their attitude in flight, it is clear that in certain circumstances, an interruption in oil flow could occur with consequent bearing damage. A particularly troublesome manoeuvre sometimes required to be performed is one in which the aircraft is required to fly inverted. In such a situation, oil contained within the tank flows to the opposite side of the tank. This can result in an interruption in oil flow from the tank as well as the blocking of air vents which are usually provided in such tanks. The air vents are intended for removal from the tank of air which accumulates as a result of the deaeration of oil returned to the tank after engine use. If these air vents are blocked by oil, tank pressurisation can occur to such an extent that tank damage results. A similar situation can exist if the aircraft is required to descend at a rate greater than the acceleration due to gravity.

It is an object of the present invention to provide a tank suitable for liquids which will continue to provide a flow of liquid therefrom for a finite period when that tank is subjected to alterations in its spacial disposition.

According to the present invention, a tank suitable for holding a liquid comprises first and secod baffles respectively adapted to divide the interior of said tank into first, second and third series interconnected chambers, each adapted to contain said liquid, an inlet adapted to supply a mixture of a gas and said liquid to said first chamber, an outlet adapted to withdraw said liquid from said third chamber and venting means having an outlet through which said gas present in said first chamber is vented, said baffles being so adapted and arranged that when said tank is in its normal spacial disposition, liquid supplied in operation to said first chamber flows into said third chamber via said second chamber and if said tank subsequently adopts a spacial disposition other than said normal spacial disposition, any flow of liquid from said third chamber to said second chamber is prevented or is of a sufficiently low level that an adequate quantity of liquid is retained within said third chamber to provide a continuity of liquid flow through said outlet for a finite time period and insufficient liquid flows from said second chamber into said first chamber to obstruct said venting means.

Said first baffle dividing said first and second chambers is preferably so inclined and configured that when said tank is in said normal spacial disposition, said liquid contained in operation in said first chamber is directed across said tank and into a generally downwardly extending passageway defined between said first baffle and said tank wall, and thence into duct means adapted to interconnect the lower region of said passageway with that portion of the lower region of said second chamber on the opposite side of said tank to said passageway.

Said second baffle dividing said second and third chambers is preferably so inclined and configured that when said tank is in said normal spacial disposition, liquid contained in operation in said second chamber is directed across said tank and into a passageway interconnecting said second and third chambers, and defined between said second baffle and the wall of said tank, the first portion of said passageway being on the same side of said tank as said passageway interconnecting said first chamber and said duct means, and extending in a generally downward direction to the base of said tank, the remaining portion thence extending in a generally upward direction to exhaust said liquid from said second chamber in the upper region of said third chamber on the opposite side of said tank to said passageway interconnecting said first chamber and said duct means, said liquid outlet being positioned immediately below the position where said liquid is exhausted from said passageway into said third chamber.

Said tank is preferably provided with pumping means adapted when said tank is in said normal spacial disposition to pump into said first chamber any gas which may collect in operation in said second and third chambers.

Said pumping means preferably comprises two venturi ejector pumps.

Said venting means through which gas may be vented from said first chamber is preferably adapted to project into said first chamber to such an extent that in all spacial dispositions of said tank, the outlet of said venting means remains above the surface of the liquid contained in operation in said first chamber.

Said second chamber may be additionally supplied with said liquid otherwise than from said first chamber.

Said mixture of a gas and liquid supplied to said tank may be a mixture of air and an oil.

Said tank may be an oil tank suitable for an aircraft mounted gas turbine engine.

The invention will now be described with reference to the accompanying drawings in which:

FIG. 2 is a sectioned side view of the same tank as is shown in FIG. 1 but showing the tank in an inverted position.

FIG. 3 is an enlarged sectioned view of a portion of the tank shown in FIG. 1.

Figure 1:
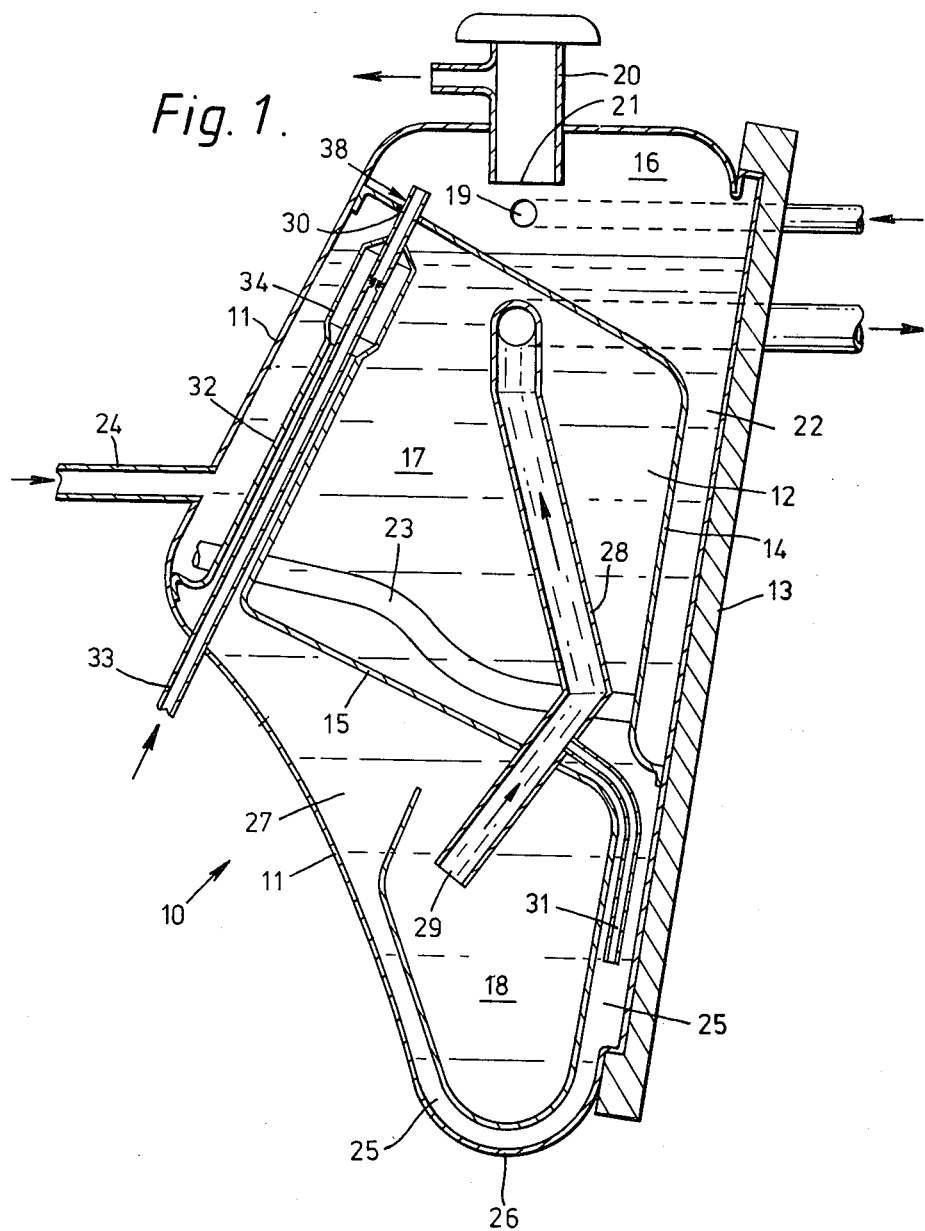
FIG. 1 is a sectioned side view of a tank in accordance with the present invention and containing an oil.

With reference to FIG. 1, a tank generally indicated at 10 is defined by a wall 11 and contains an oil 12. A mounting feature 13 is provided on one side of the tank 10 by means of which the tank 10 is attached to a gas turbine engine (not shown) adapted to power an aircraft.

Since in operation, gas turbine engines adapted to power aircraft are subjected to changes in attitude and acceleration forces during flight, then it follows that the spacial disposition of the tank 10 and the oil 12 contained within it will change accordingly. More specifically the spacial disposition of the tank 10 will be subject to changes in aircraft attitude and the spacial disposition of the oil 12 subject to changes in acceleration forces as well as changes in aircraft attitude. The spacial dispositions of the tank 10 and oil 12 shown in FIG. 1 are those adopted when the aircraft on which they are mounted is in level flight and flying at a constant speed without changes in its direction of flight. Throughout this specification the spacial disposition of the tank 10 shown in FIG. 1 will be referred to as its normal spacial disposition. In the interests of clarity, however it is to be assumed throughout this specification (unless otherwise stated) that the dispositon of the oil 12 is that which it adopts when subjected only to acceleration forces due to gravity. It will be appreciated that if the oil 12 is subjected to acceleration forces other than those due to gravity and the tank 10 is maintained in its normal spacial disposition, the movement of the oil within the tank 10 will be the same as that which would result from alterations in the spacial disposition of the tank 10.

The tank 10 contains first and second baffles 14 and 15 which divide its interior into three chambers 16, 17 and 18. The first chamber 16 is situated in the upper region of the tank 10 and is provided with an inlet 19 through which a mixture of air and oil is supplied and a vent 20 having an outlet 21 through which the air is exhausted. The first baffle 14 is inclined over a portion of its length to provide an inclined floor to the chamber 16. However on the right hand side of the tank 10 (when viewed in FIG. 1) the first baffle 14 is angled so that it cooperates with the wall 11 of the tank 10 to define a generally downwardly extending pasageway 22 which terminates below the mid-point of the tank 10. Thus oil delivered to the first chamber 16 through the inlet 19 initially de-aerates in the first chamber 16 before flowing into the passageway 22.

The second chamber 17 is situated immediately below the first chamber 16 between the first and second baffles 14 and 15 and is fed with oil from the passageway 22 by a duct 23 which extends from the lower region of the passage 22 to that portion of the lower region of the second chamber 17 on the left hand side of the tank 10. Oil is additionally supplied to the second chamber 17 through an inlet 24, this supply of oil being substantially air free.

The second baffle 15 is inclined over a portion of its length in a similar manner to the first baffle 14 so as to provide an inclined floor to the chamber 17 and angled and curved so that it cooperates with the wall 11 of the tank 10 to define a passageway 25 interconnecting the second chamber 17 with the third chamber 18. More specifically the passageway 25 has a first portion which extends in a generally downward direction on the right hand side of the tank 10 to the tank base 26. The remaining portion of the passageway 25 then extends from the tank base 26 in a generally upward direction on the opposite side of the tank 10 to the first portion of the passageway 25 to terminate in a flared outlet 27 in the upper region of the third chamber 18. Consequently oil is suplied to the third chamber 18 from the second chamber 17 via the passageway 25.

It will be seen therefore that the first, second and third chambers 16, 17 and 18 are series interconnected by the passages 22 and 25 and to duct 23 so that when the tank 10 is in its normal spacial disposition, oil delivered to the first chamber 16 flows under the influence of gravity into the third chamber 18 via the second chamber 17.

Oil contained in the third chamber 18 is drawn off through a duct 28 having an outlet 29 which is positioned immediately below the flared outlet 27.

The tank 10 is adapted in operation to constitute a portion of the lubrication oil circuit of the gas turbine engine on which it is mounted. Thus oil drawn off from the third chamber 18 through the duct 28 is passed through a pump to pressurise the oil and thence to various bearings within the engine in order to provide lubrication for those bearings. After the oil has drained from these bearings, it is eventually returned to the first chamber 16 via the oil inlet 19.

It is inevitable that as the oil passes around the various bearings in the engine, increasing quantities of air will become entrained in it. Consequently by the time the oil is returned to the tank 10 it will be aerated. In order to separate this air from the oil prior to the oil being re-used for lubrication purposes, it is passed through a centrifugal separator (not shown). Such separators are well known in the art and consequently will not be described. The separator output is constituted by two flow streams: a first which is predominantly oil and a second which is predominantly air. The oil stream is directed into the second chamber 17 through the inlet 24 whilst the air stream is directed into the first chamber 16. Since centrifugal separators are not 100% efficient, the first chamber 16 is in fact supplied with an oil mist which separates out within the first chamber 16 so that the air constituent of the mist is exhausted through the outlet 21 of the vent 20 whilst the remaining oil flows down the inclined portion of the first baffle 14 and into the passageway 22. It will be appreciated however that whilst the described embodiment of the present invention employs a centrifugal separator in order to deaerate the oil, deaeration could in fact take place exclusively within the first chamber 16. Thus oil contained in the first chamber 16 could deaerate during its residence time in the first chamber 16, the separated air being exhausted from the first chamber 16 as previously described through the outlet 21 of the vent 20. In such an arrangement, it would not of course be necessary to supply the second chamber 17 with oil through the inlet 24.

Since it is likely during the operation of the tank 10 that small amounts of air will pass into the second chamber 17, a hole 30 is provided in the uppermost portion of the first baffle 14. The hole 30 ensures that any air which may collect in the upper region of the second chamber 17 will pass into the first chamber 16 from where it will be exhausted through the outlet 21 of the vent 20.

Since oil supplied to the tank 10 is deaerated in both the first and second chambers 16 and 17, the oil which finally drains into the third chamber 18 and is drawn off through the tank outlet 29 is substantially air-free.

If, as a result of a change in aircraft attitude, the tank 10 is inverted, the oil contained in the tank 10 will be re-positioned as can be seen in FIG. 2.

Thus oil contained in the passageway 22 will drain back into the first chamber 16. In order to prevent the oil contained within the first chamber 16 blocking the vent outlet 21, the body of the vent 20 is adapted to project into the first chamber 16 to such an extent that in all angular dispositions of the tank 10, the vent outlet 21 remains above the oil level, within the first chamber 16.

The majority of the oil contained in the second chamber 17 is prevented from flowing into the first chamber 16 by the dispositions of the first baffle 14 and the duct 23. A small amount of oil will flow into the first chamber 16 through the hole 30 in the first baffle 14. However the hole 30 is of such a diameter that whilst it is of sufficient size to permit air to pass between the chambers 16 and 17, it is too small to permit any significant oil flow.

A portion of the oil contained in the first portion of the passageway 25 will flow back into the second chamber 17. However the oil contained in the remaining portion of the passageway 25 together with the oil contained in the third chamber 18 will remain in position so that a reservoir of oil is available within the third chamber 18 to be drawn off through the oil outlet 29. It will be seen therefore that the reservoir of oil available within the third chamber 18 will provide a continuity of oil flow through the oil outlet 29 for a finite time period. Consequently the gas turbine engine on which the tank 10 is mounted is provided with a continued oil supply for a finite time period when the tank 10 is inverted.

In certain circumstances, it may be desirable that the gas turbine engine on which the tank 10 is mounted should operate inverted for a time period longer than the finite time period during which the third chamber 18 provides a continued oil supply to the oil outlet 29. The dimensions of the third chamber 18 may of course be altered so as to increase its oil capacity. However such alteration may not be possible because of constraints provided by the situation of the oil tank 10. In these circumstances we prefer to provide the oil outlet duct 28 with a pipe 31 which interconnects the interior of the oil outlet 28 with the first portion of the passageway 25 between the second and third chambers 17 and 18. Thus when the tank 10 is inverted, the pipe 31 is exposed to the air which is contained within the first portion of the passageway 25. Consequently the flow of oil through the oil outlet duct 28 will induce a flow of air through the pipe 31 which air will become entrained in the oil flowing through the oil outlet duct 28. The entrained air has the effect of diluting the oil so that the finite time period during which the reservoir of oil within the third chamber 18 provides a continuous supply of oil is extended. We prefer to dimension the pipe 31 so that the air/oil ratio of the contents of the oil outlet duct 28 is in the region of 4:1. Consequently the finite time period during which the third chamber 18 provides a continuous supply of oil is increased by four times.

Notwithstanding that the oil derived from the tank 10 is aerated in this manner when the tank 10 is inverted, it still provides adequate lubrication for the bearings of the gas turbine engine. Thus we have found that even plain bearings will tolerate lubrication with such aerated oil.

It will be appreciated that although the forgoing description has been with respect to a tank 10 that has been inverted, the tank 10 will function in the same manner if it is maintined in its normal spacial disposition but exposed to acceleration in a downward direction at a rate greater than the acceleration due to gravity.

When the tank 10 is returned to its normal spacial disposition after inversion, it will be apparent that air will have collected in the second and third chamber 17 and 18. It is important that this air, especially that in the third chamber 18, should be removed as quickly as possible. If it is not, a further inversion of the tank 10 could find the third chamber 18 with insufficient oil to maintain an oil flow through the oil outlet duct 28 for the required finite time period. In order to facilitate the removal of this air, the upper region of the third chamber 18 is provided with an enclosed extension piece 32, which extends into the upper region of the second chamber 17. The extension piece 32 contains a duct 33 which projects through the end of the extension piece 32 and the hole 30 in the first baffle 14 to terminate in the first chamber 16.

The upper portion of the extension piece 32 is enlarged at 34 as can be seen more clearly in FIG. 3. The portion of the duct 33 within the enlarged extension piece portion 34 is provided with a venturi 35 adjacent to which are two small diameter passages 36 interconnecting the interior of the duct 33 with that of the extension piece 32. In operation, air is supplied under pressure to the duct 33 so that the venturi 35 and the passages 36 constitute an ejector pump 37.

Thus air which collects in the third chamber 18 during inversion of the tank 10 migrates into the extension piece 32 when the tank 10 returns to its normal spacial deposition. The ejector pump 37 then pumps that air through the passages 36 and into the air stream passing through the duct 33. Air from the duct 33 is exhausted into the first chamber 16 from where it is vented through the vent 20. Consequently any air which has collected in the third chamber 18 is rapidly pumped into the first chamber 16 as soon as the tank 10 returns to its normal spacial disposition. When the air has been pumped out of the extension piece 32, it is inevitable that a certain amount of oil will then be pumped by the ejector pump 37 from the extension piece 32 into the first chamber 16. The passages 36 are so dimensioned, however, that this flow of oil is minimal.

The hole 30 in the first baffle 14 is of a slightly larger diameter than that of the air duct 33 so that the hole 30 and air duct 33 constitute a second ejector pump 38 which serves to pump air from the second chamber 17 into the first chamber 16. Consequently the oil level within the second chamber 17 is also rapidly restored to its normal level after an excursion in which the tank 10 has been inverted.

The operation of the tank 10 in accordance with the present invention has been described with respect to the tank 10 in its normal spacial disposition and in an inverted disposition. It will be appreciated, however that the tank will function in other spacial dispositions. Thus depending on the spacial disposition being considered, the oil outlet duct 28 will have access to either a fixed reservoir of oil in the third chamber 18 which will provide oil supply for a finite time period or alternatively a reservoir of oil which is continuously replenished by oil supplied by the second and first chambers 17 and 16. Moreover the internal configuration of the tank 10 is such that in other spacial dispositions of the tank 10 insufficient oil flows from the second chamber 17 into the first chamber 16 to obstruct the outlet 21 of the vent 20.

We claim:

1. A tank suitable for holding a liquid comprising first and second baffles adapted to divide the interior of said tank into first, second and third series interconnected chambers, each adapted to contain said liquid, and inlet adapted to supply a mixture of a gas and said liquid to said first chamber, an outlet adapted to withdraw said liquid from said third chamber and venting means having an outlet through which said gas present in said first chamber is vented, said baffles being so adapted and arranged that when said tank is in its normal spacial disposition, liquid supplied in operation to said first chamber flows into said third chamber via said second chamber, and if said tank subsequently adopts a spacial position other than said normal spacial disposition, the flow of liquid from said third chamber to said second chamber is prevented or is of a sufficiently low level that an adequate quantity of liquid is retained within said third chamber to provide a continuity of liquid flow through said outlet for a finite time period and unsufficient liquid flows from said second chamber into said first chamber to obstruct said venting means.

2. A tank suitable for holding a liquid as claimed in claim 1 wherein said first baffle and said tank wall define a generally downwardly extending passageway, duct means being provided to interconnect the lower region of said passageway with that portion of the lower region of said second chamber on the opposite side of said tank to said passageway, said first baffle being adapted to direct liquid contained in operation in said first chamber across said tank, and into said downwardly extending passageway, said liquid thence flowing into said duct means.

3. A tank suitable for holding a liquid as claimed in claim 2 wherein said second baffle and the wall of said tank define a passageway interconnecting said second and third chambers, the first portion of said passageway being on the same side of said tank as said passageway interconnecting said first chamber and said duct means and extending in a generally downward direction to the base of said tank, the remaining portion thence extending in a generally upward direction to terminate in the upper region of said third chamber on the opposite side of said tank to said passageway interconnecting said first chamber and said duct means, said liquid outlet being positioned immediately below the position where said passageway terminates in said third chamber, said second baffle dividing said second and third chambers being so inclined and configured that when said tank is in said normal spacial disposition, liquid contained in operation in said second chamber is directed across said tank and into said passageway interconnecting said second and third chambers, said liquid thence passing through said passageway and into said third chamber.

4. A tank suitable for holding a liquid as claimed in claim 1 wherein pumping means is adapted, when said tank is in said normal spacial disposition, to pump into said first chamber any gas which may collect in operation in said second and third chambers.

5. A tank suitable for holding a liquid as claimed in claim 4 wherein said pumping means comprises two venturi ejector pumps.

6. A tank suitable for holding a liquid as claimed in claim 1 wherein said venting means through which gas may be vented from said first chamber is adapted to project into said first chamber to such an extent that in all spacial dispositions of said tank, the outlet of said venting means remains above the surface of the liquid contained in operation in said first chamber.

7. A tank suitable for holding a liquid as claimed in claim 1 wherein said second chamber is additionally supplied with said liquid otherwise than from said first chamber.

8. A tank suitable for holding a liquid as claimed in claim 1 wherein said mixture of a gas and liquid supplied to said tank is a mixture of air and an oil.

* * * * *